(12) United States Patent
DeWath et al.

(10) Patent No.: US 9,118,559 B2
(45) Date of Patent: Aug. 25, 2015

(54) MEASURING INSTANTANEOUS BIT RATE IN A NETWORK CONNECTION

(75) Inventors: Edward J. DeWath, Cupertino, CA (US); Loc T. Le, San Jose, CA (US)

(73) Assignee: SEJENT CORPORATION, Santa Clara, CA (US)

( * ) Notice: Subject to any disclaimer, the term of this patent is extended or adjusted under 35 U.S.C. 154(b) by 275 days.

(21) Appl. No.: 13/441,797

(22) Filed: Apr. 6, 2012

(65) Prior Publication Data

US 2012/0257535 A1    Oct. 11, 2012

Related U.S. Application Data

(60) Provisional application No. 61/472,552, filed on Apr. 6, 2011.

(51) Int. Cl.
*H04L 12/26* (2006.01)

(52) U.S. Cl.
CPC ............ *H04L 43/0876* (2013.01); *H04L 43/10* (2013.01)

(58) Field of Classification Search
CPC ..................... H04L 43/0852–43/0894; H04L 43/10–43/106
See application file for complete search history.

(56) References Cited

U.S. PATENT DOCUMENTS

| | | | | |
|---|---|---|---|---|
| 4,571,675 A * | 2/1986 | Stambaugh et al. | .......... | 709/250 |
| 5,001,731 A * | 3/1991 | Atwell et al. | .................. | 375/356 |
| 5,943,604 A * | 8/1999 | Chen et al. | ................... | 455/3.06 |
| 6,201,791 B1 * | 3/2001 | Bournas | ......................... | 370/234 |
| 7,295,520 B2 | 11/2007 | Lee | | |
| 7,545,749 B2 | 6/2009 | Jourdain et al. | | |
| 7,577,883 B2 | 8/2009 | Pei et al. | | |
| 7,706,299 B2 | 4/2010 | Chang et al. | | |
| 7,782,794 B2 | 8/2010 | Sebastian | | |
| 7,826,362 B2 | 11/2010 | Price et al. | | |
| 7,826,363 B2 | 11/2010 | Dunlap et al. | | |
| 7,876,696 B2 | 1/2011 | Kotelba | | |
| 7,885,281 B2 | 2/2011 | Sindhu et al. | | |
| 2002/0080726 A1 * | 6/2002 | Klassen et al. | ................ | 370/252 |
| 2004/0052257 A1 * | 3/2004 | Abdo et al. | ................... | 370/392 |
| 2004/0203557 A1 * | 10/2004 | Zhang | ........................... | 455/403 |
| 2005/0238090 A1 * | 10/2005 | Ooghe et al. | .................. | 375/222 |
| 2006/0083168 A1 * | 4/2006 | Prakash | ....................... | 370/230 |

(Continued)

OTHER PUBLICATIONS

International Search Report issued Oct. 23, 2012 in corresponding PCT/US12/032482.

(Continued)

*Primary Examiner* — Chirag Shah
*Assistant Examiner* — Rina Pancholi
(74) *Attorney, Agent, or Firm* — Pillsbury Winthrop Shaw Pittman LLP

(57) ABSTRACT

Methods and apparatuses described herein are configured to calculate the instantaneous bit rate of a network connection. According to certain aspects, conventional solutions measure average bit rate of a network, whereas the techniques described herein are configured to measure the instantaneous bit rate. According to further aspects, structurally, conventional solutions require external devices (hosts or servers) and a plurality of data packets for measurement, whereas the present invention is self-referenced and requires, in principle, only two network packets, of any type, for measuring the instantaneous bit rate. The instantaneous bit rate can then be used to adjust the transmission bit rate of network packets to optimize the network connection such that the bandwidth of the network connection is fully utilized and packet loss is avoided.

26 Claims, 6 Drawing Sheets

(56) References Cited

U.S. PATENT DOCUMENTS

| | | |
|---|---|---|
| 2006/0218264 A1* | 9/2006 | Ogawa et al. ............. 709/223 |
| 2007/0171836 A1* | 7/2007 | Yoshimi et al. ............ 370/250 |
| 2009/0003225 A1* | 1/2009 | Klassen et al. ............ 370/250 |
| 2009/0016238 A1 | 1/2009 | Yu |
| 2009/0113045 A1 | 4/2009 | Kozisek |
| 2009/0221241 A1* | 9/2009 | Ghosh ....................... 455/69 |
| 2009/0319233 A1 | 12/2009 | Klemets |
| 2010/0121972 A1* | 5/2010 | Samuels et al. ............ 709/231 |
| 2010/0146107 A1 | 6/2010 | Fiatal |
| 2010/0265833 A1 | 10/2010 | Ou et al. |
| 2010/0293243 A1 | 11/2010 | Wittwer |
| 2011/0051607 A1 | 3/2011 | Begen |

OTHER PUBLICATIONS

Pasztor et al "Active Probing Using Packet Quartets", Proc. Of the ACM SIGCOMM Internet Measurement Workshop, Nov. 6, 2002, pp. 293-305.

Prasad and Claffy, et al., "Bandwidth Estimation: Metrics, Measurement Techniques, and Tools", IEEE Network, Nov./Dec. 2003, pp. 27-35.

Search Report issued Oct. 29, 2014 in corresponding European application No. 12768082.5.

\* cited by examiner

MEASURING INSTANTANEOUS BIT RATE IN A NETWORK CONNECTION

CROSS-REFERENCE TO RELATED APPLICATIONS

The present application claims priority to U.S. Provisional Patent Application No. 61/472,552 filed Apr. 6, 2011, which is incorporated herein by reference in its entirety.

FIELD OF THE INVENTION

The present invention relates generally to data communications, and more particularly to systems and methods for measuring data rates of network connections.

BACKGROUND OF THE INVENTION

The achievable service quality of an Internet access network is contingent on the network connection's available bit rate (i.e., bandwidth). Services such as Voice over Internet Protocol (VoIP), video streaming or videoconferencing, on-line gaming, or other "time-sensitive" applications, referred to as real-time applications, require bandwidth at a specific rate for acceptable performance. Conventional solutions to measuring bit rate only measure an average bit rate over time. But because available bandwidth is constantly varying in a network connection at any given point in time due to drastically changing network conditions, conventional methods that only measure the average bit rate over a period of time are inadequate. In addition, to perform the average bit rate measurement, conventional methods require external servers and multiple data packets.

Conventional methods of speed test measurements, generally known to the public, use servers located in the Internet. Network test packets, which are issued by the requestor, commonly must traverse a number of intermediate nodes before arriving at the speed test server. In such methods, the supposed speed measurement is, in practice, at best merely a measure of the slowest link speed, and not necessarily the actual speed of the requestor's direct connection. A major disadvantage of this conventional speed test approach is that it is not useful for specifying service levels for Quality of Service, which requires a guaranteed available bandwidth, since Internet packets are transmitted on a "best effort" basis and may traverse various nodes that have varying link speeds.

Known conventional methods for acquiring connection bit rate estimates include: (1) interrogating the Internet Service Provider ("ISP"), or (2) interrogating the access modem directly, or (3) manually entering the likely bandwidth at the user premises equipment, or (4) running bit rate estimation algorithms using Internet Control Message Protocol (ICMP) ("Pings") or Transmission Control Protocol (TCP) echo requests with a server, or (5) running a rate estimation algorithm based on real-time traffic. The primary disadvantages of these methods, respectively, are: (1) bit rate information is, in practice, not available from an ISP, or (2) bit rate measurement and reporting is not a feature of today's Internet access modems, or (3) manual settings, even when updated periodically, cannot reflect rapidly changing conditions on the network, or (4) rate estimation algorithms provide time-averaged estimates (that is, non-instantaneous estimates.)

Conventional methods are also generally intrusive, require user invocation, and cannot provide the rapid speed measurements necessary to secure fast, error-free, network-efficient connections per session. Other methods include using timestamps in packets to determine network bandwidth, but these methods cannot account for the clock skew of each of the devices at the various hops on the network that a packet must traverse through. Methods using satellites have been tried to account for this clock skew problem, but these approximation methods encounter many additional problems.

SUMMARY OF THE DESCRIPTION

Methods and apparatuses described herein are configured to measure the instantaneous bit rate of a network connection. Conventional solutions measure average bit rate of a network connection, whereas the techniques described herein measure instantaneous bit rate. According to certain aspects, the techniques described herein include leveraging the existing network infrastructure to obtain self-referenced bit rate measurements. There are a variety of ways to do this. One embodiment includes transmitting packets to another agent on the network, typically located at the first hop, such that the packets are echoed back to the agent that initiated the packet transmission. The transmitting agent is referred to as the initiating agent and the agent at the first hop is referred to as the responding agent.

Once the packets are received back from the responding agent, their time of arrival can be timed and the timing of the echoed packets can then be used to calculate the instantaneous bit rate of the network connection at any point in time. The instantaneous bit rate of the upstream connection can then be used to adjust the transmission bit rate of network packets to optimize the network connection such that network bandwidth is fully utilized and packet loss and retransmission are avoided.

By analogy, conventional solutions are similar to estimating vehicle speed with a stop watch at particular points along the roadway, whereas the embodiments described herein are adapted to measure speed using an on-board speedometer.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, in which.

DETAILED DESCRIPTION

Figure 1A:
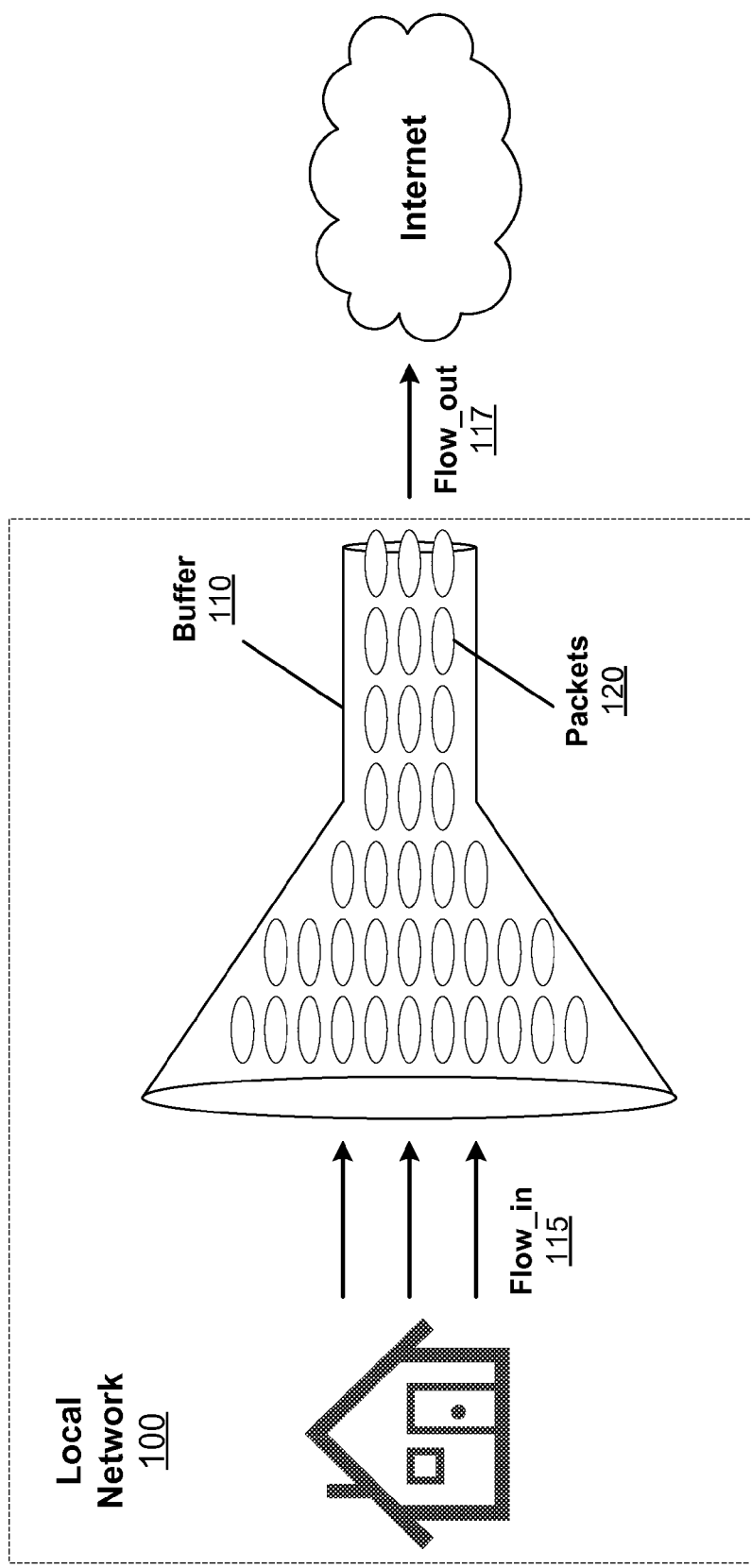
FIG. 1A depicts a functional visualization of network packets flowing from a local area network out onto the Internet.

Throughout the description, for the purposes of explanation, numerous specific details are set forth in order to provide a thorough understanding of the invention. It will be apparent, however, to one skilled in the art that the embodiments described herein may be practiced without some of these specific details. In other instances, well-known structures and devices are shown in block diagram form to avoid obscuring the underlying principles of the various embodiments.

There exists a need to non-intrusively measure instantaneous bit rate of network connections, on-line and in real-time, in order to optimize network connections to account for varying network conditions. This has heretofore been a difficult problem to solve because network bandwidth is constantly and drastically varying in time. For instance, the bit rate of a wide-area network connection can typically vary from 10 kb/s up to 20 Mb/s or more. In addition, there is no way to account for clock skew of all of the network elements a packet traverses through to obtain accurate timing information. At any given moment, the local network equipment (such as a router in a local area network) does not know the rate at which traffic can be transmitted onto the wide-area network. This results in transmitting too many or too few network packets onto the network, which causes both wasted bandwidth in the network as well as dropped packets.

In order to optimize network efficiency, the instantaneous available bandwidth of the network must therefore be known at the time the packet is transmitted thereon. This, in turn, requires knowledge of the instantaneous available bit rate of the wide-area network connection. Once the instantaneous bit rate of a network connection is known, the transmission bit rate onto the network can be adjusted accordingly to take full advantage of the available bandwidth. Matching the bit rate of the network connection with the bit rate of packet transmission across it leads to a much more efficient utilization of network resources.

In addition, when the instantaneous bit rate of the network connection is matched to the transmission bit rate of the network packets, the amount of "lag" in the network connection can be reduced or eliminated altogether. "Lag" generally occurs when packets are dropped or delayed (high latency) during transmission in real-time applications such as VoIP, video streaming, or online gaming. For real-time applications, dropped packets generally cannot be retransmitted and are thus lost forever. This results in a break in the data stream which is experienced as a glitch in the real-time application. The cause of lag is the drastic variation in bandwidth of a network connection and the network packet congestion that this variation causes. By matching packet transmission bit rate with the instantaneous bit rate of the network connection, dropped packets are avoided, and the need for retransmission is therefore likewise avoided so that every bit of bandwidth of the network connection can be utilized.

Methods and apparatuses described herein are configured to measure instantaneous bit rate of a network connection. These embodiments include performing self-referenced measurement techniques that require, in principle, only two data packets, of any type, for measuring the instantaneous bit rate of a network connection. These novel techniques are self-referenced using the same clock to determine the inter-packet timing—the same clock is used for transmitting, receiving, and timing the network packets so that clock skew is eliminated altogether.

FIG. 1A depicts a functional visualization of network packets flowing from a local network out onto the Internet. In the diagram, local network 100 transmits packets 120 through a network transmission buffer 110 and out onto the Internet. In a typical home or business local area network, the local bandwidth is much greater than the bandwidth of the network it is connected to. The network bandwidth of local networks is growing at a much faster pace than that of larger wide-area networks, such as the Internet. The bandwidth of local home networks can be somewhere between 100 and 1000 times greater than the bandwidth of an Internet connection. Thus the bit rate of the local network will always be greater than the bit rate of the wide-area network. Network "lag" occurs because of a bottleneck when the network packets must travel from a high bandwidth connection of a local network to a low bandwidth connection of a wide-area network, such as the Internet.

Figure 1B:
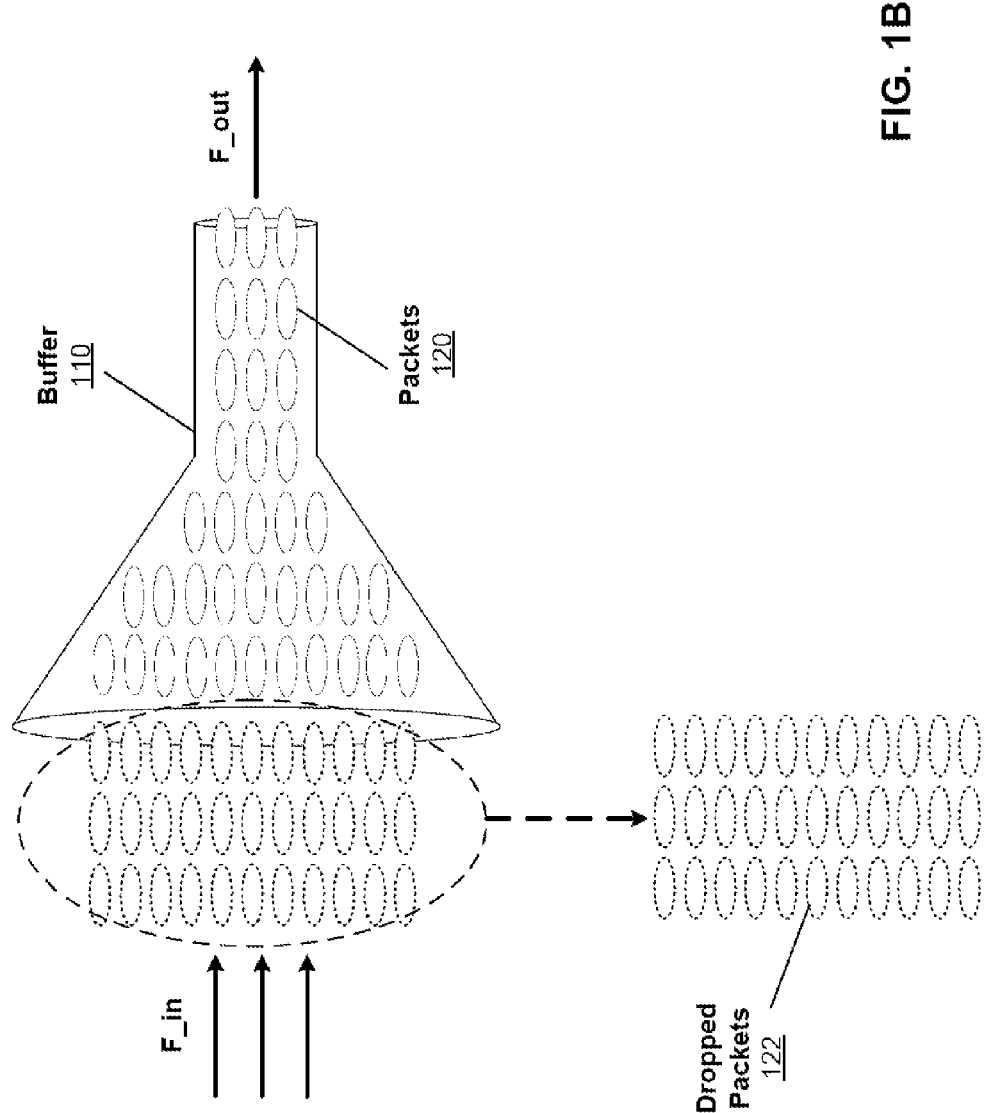
FIG. 1B depicts a functional visualization of network packets being dropped from a transmission buffer due to congestion.

In FIGS. 1A and 1B, buffer 110 represents a transmission buffer connected to the Internet (or other wide-area network) for the purpose of transmitting packets onto the network. This buffer may be for example, a modem buffer, such as an adaptive-rate buffer ("ARB"). But other types of buffers may also be used. Buffer 110 may be any data buffer used by local network equipment to stage network packets for transmission onto a network as known and understood by persons of skill in the art. A data buffer is generally physical memory implemented as a queue which is used to temporarily hold data while it is being moved from one place to another. Buffers are often used in circumstances where there is a difference between the rate at which data is received and the rate at which it can be processed and sent out. Buffers compensate for these differences in rates by receiving data into one end of the queue at one rate and sending the data out of the other end of the queue at a different rate. Buffer 110 may also represent the buffer of other network equipment such as a router buffer. As Internet connection speeds increase, networking equipment tends to incorporate ever larger data buffers to effect a "smoother" traffic flow at the expense of increased latency or "lag."

In addition, the techniques described herein are applicable to any type of network packet. Typical packets include, but are not limited to, User Datagram Protocol (UDP) packets, Transmission Control Protocol (TCP) packets, and Internet Control Message Protocol (ICMP) packets.

In FIG. 1A, the transmission buffer 110 is represented as a funnel for purposes of explaining how the packets flow in a network buffer and is not intended to be limiting in any way. As shown in the diagram, the network packets 120 flow into (flow_in 115) the larger end of the buffer which represents the higher bandwidth of the local network. The network packets 120 are then uploaded onto the Internet (or other wide-area network connection) which is represented as the smaller end of the buffer 110. As can be seen, the flow out (flow_out 117) of the packets is limited by the bandwidth of the Internet connection, and not the local network.

The fill time of buffer 110 is given by the equation:

$$t_F = \frac{V}{(\text{Flow\_in} - \text{Flow\_out})}$$

where:
$t_F$ is the fill time, and
V is the volume of data the buffer can hold

The time for the buffer to completely empty, which is known as the "latency" of the buffer, is therefore given by the equation:

$$t_E = \frac{V}{\text{Flow\_out}}$$

where: $t_E$ is the time it takes to empty the buffer

Accordingly, in cases where the local network sends too many packets, they cannot all make it out onto the Internet and some packets must be dropped. Likewise, when the local network sends too few packets, the network bandwidth is wasted. This is shown in FIG. 1B, which depicts a functional visualization of network packets being dropped from a transmission buffer. In the illustration, buffer 110 is overloaded with too many packets coming from the local network (F_in). Thus packets 120 make it through to the network (F_out) but packets 122 are dropped. As discussed above, in many cases where the application is a real-time application, these dropped packets cannot be retransmitted and are lost forever. In applications such as on-line gaming, for example, this leads to the phenomenon called game "lag."

Figure 2:
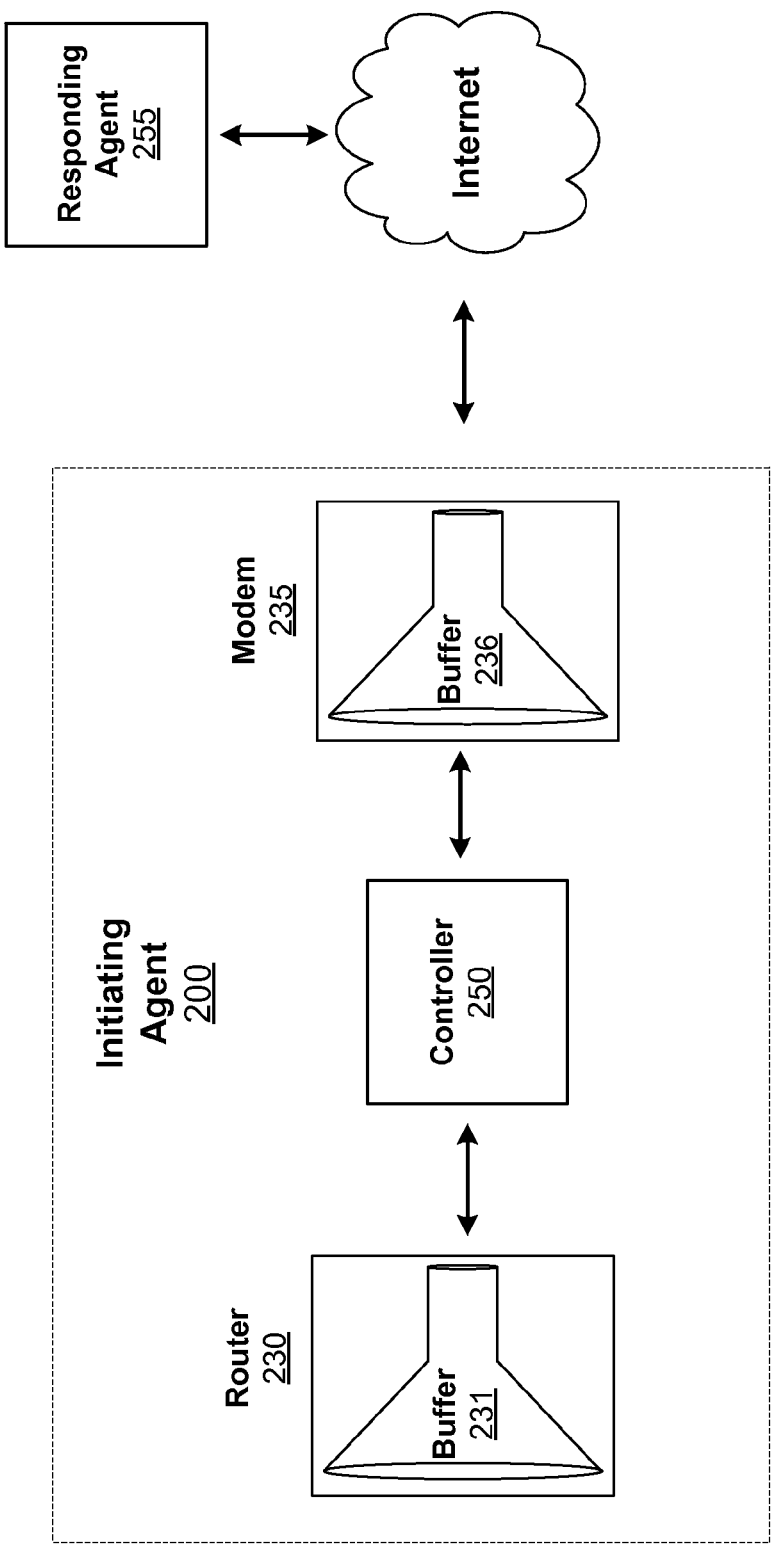
FIG. 2 depicts an example functional block diagram of network elements of a local network connected to the Internet according to one embodiment.

FIG. 2 depicts an example functional block diagram of network elements of a local network connected to the Internet according to one embodiment. Initiating agent 200 is located in the local network (see, e.g., FIGS. 1A-1B) and includes network equipment such as a router 230 and modem 235, which are configured to initiate packet transmissions onto the Internet. However, initiating agent 200 can have more or fewer components in other embodiments. In the illustrated embodiment, router 230 includes its own buffer 231 and modem 235 includes its own buffer 236 for transmitting packets out onto the Internet. In the preferred embodiment, the network bit rate measurement functionality is embedded into a controller 250 placed between the router 230 and modem 235 in the local network. But embodiments are not so limited, as will be shown and described below, because the controller can be located within the modem or router, or between the modem and the network connection. Other locations are also possible. Controller 250 is configured to control one or more of the buffers 231 and 236 of router 230 and modem 235, respectively, for efficient transmission of packets onto the Internet. Together, the components of initiating agent 200 perform control and computational functions for transmitting packets onto the Internet.

Packets sent from initiating agent 200 are uploaded to the Internet and are received at a responding agent 255. Responding agent 255 will receive the network packets from initiating agent 200 and respond to them accordingly. The responding agent can be any active node on the Internet. For example, the responding agent could be a router, gateway, or a switch, that receives, relays, and responds to network packets. In a representative embodiment, the responding agent includes a modem, router, and computing device in a wide area network (WAN) such as the Internet. Typically, the responding agent will be at the first hop in the network path. Thus the responding agent 255 will generally be the nearest server or host on the network. Once the responding agent 255 is located, initiating agent 200 and responding agent 255 form a connection for sending and receiving network packets. The advantage of this close connection is that it enables accurate bit rate measurement of just the initiating agent. Compare this to conventional "speed" measurements (over many hops), where the slowest link in the chain of hops actually determines the "speed" measurement.

Figure 3:
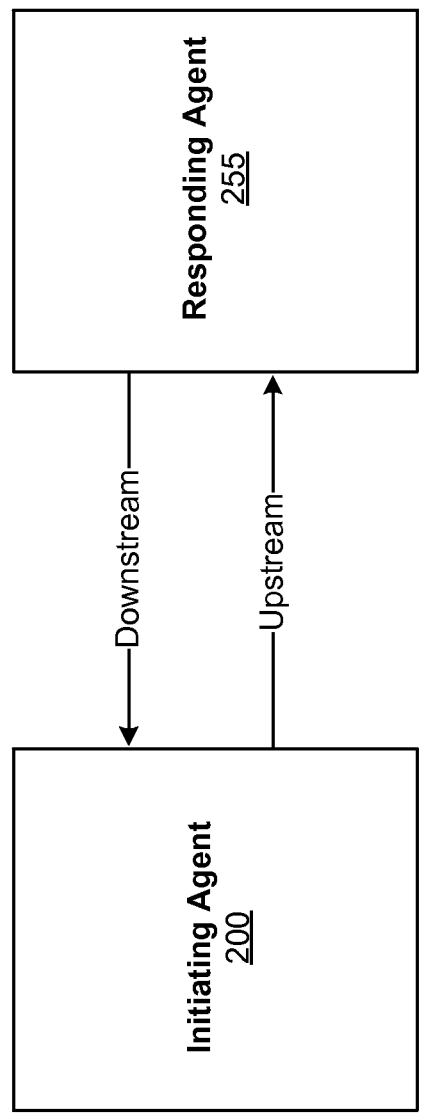
FIG. 3 depicts an example functional block diagram of an initiating agent coupled with a responding agent in a network connection according to one embodiment.

FIG. 3 depicts an example functional block diagram of an initiating agent coupled with a responding agent in a network connection. As shown in the illustrated embodiment, by convention, initiating agent 200 sends network packets to responding agent 255 by way of an upstream pathway and responding agent 255 sends network packets to the initiating agent 200 by way of a downstream pathway. These paths together comprise a bi-directional network link between the entities. A feature of the network connection shown between initiating agent 200 and responding agent 255 is that the upstream bit rate will be equal to or less than the downstream bit rate. This feature is exploited to measure the instantaneous bit rate of the network connection as discussed in more detail below.

Figure 4:
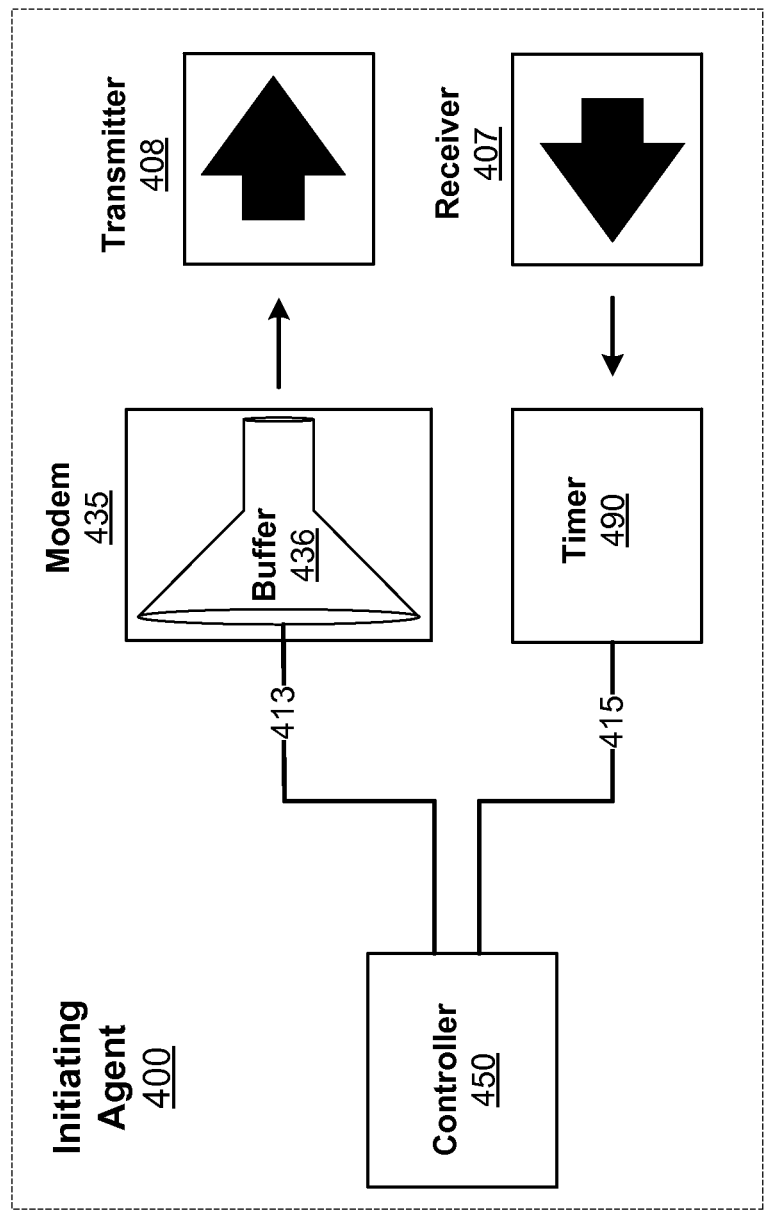
FIG. 4 depicts an example functional block diagram of elements of an initiating agent in one embodiment.

FIG. 4 depicts an example functional block diagram of elements of an initiating agent. Initiating agent 400 can be implemented in hardware or software, or combination of hardware and software. In one embodiment, the initiating agent includes a small embedded computer with embedded software that executes algorithms such as those described herein. The initiating agent can also be implemented using electronic components similar to those found in a consumer home router, and requisite application-specific embedded software. A typical set of hardware components includes a processor (CPU), main memory, non-volatile memory, timers, Ethernet ports, and so forth. The initiating agent can also be implemented on a PC provided that the software has access to low-level networking functionality such as the ability to directly transmit and receive one or more bits of data.

In the illustrated embodiment, initiating agent 400 includes a modem 435 having a transmit buffer 436 coupled with a transmitter 408 for transmitting network packets onto the Internet. Initiating agent further includes a receiver 407 for receiving network packets from the Internet. Receiver 407 is coupled with a timer 490. A controller 450 is provided and is coupled with modem 435 via data and control lines 413. Controller 450 is further coupled with timer 490 via data and control lines 415. In the embodiment shown, the controller 450 is separate and distinct from modem 435. In other embodiments, controller 450 and modem 435 can be incorporated into a single component. Likewise, the other elements of initiating agent 400 can be separate components or combined as one component without departing from the underlying principles of the invention.

Figure 5:
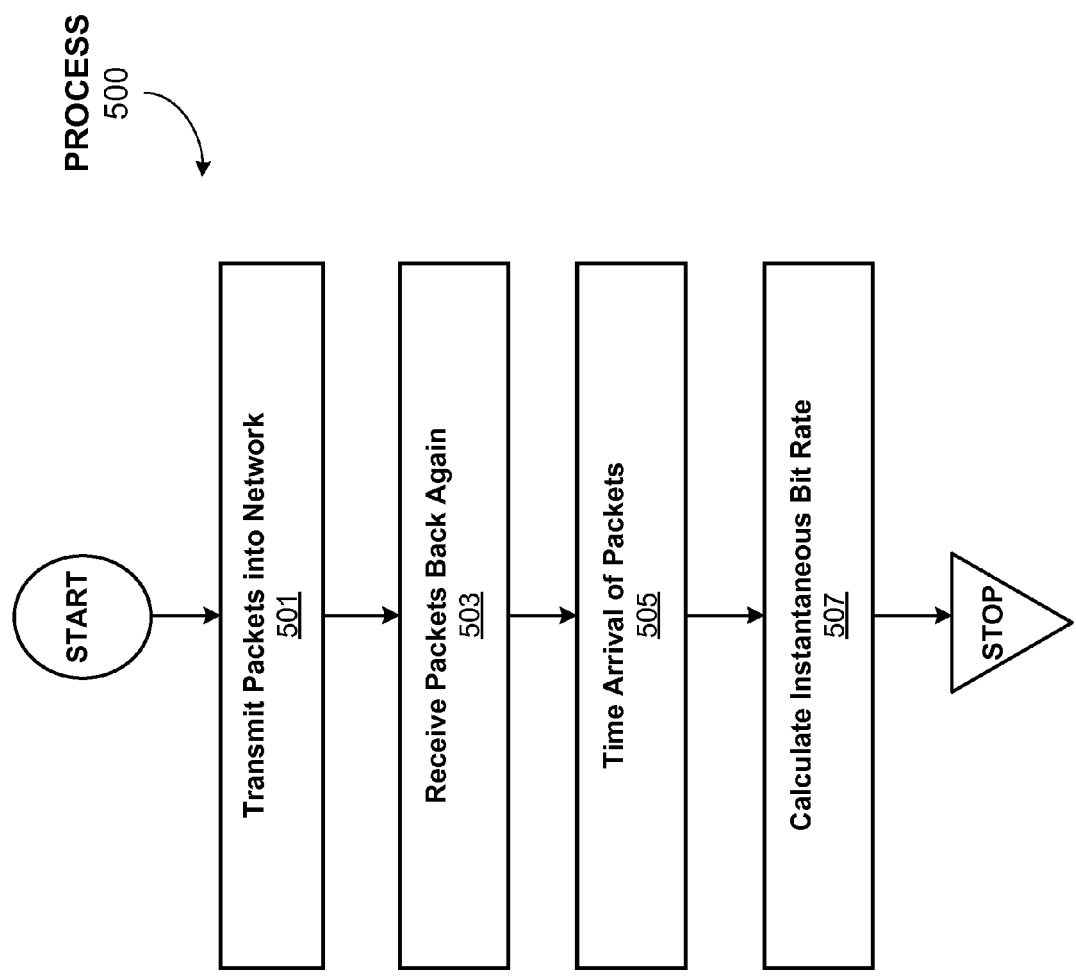
FIG. 5 depicts a flow chart showing an example of a method for measuring the instantaneous bit rate of a network connection according to one embodiment.

The operation of initiating agent 400 will now be described in conjunction with FIG. 5, which depicts a flow chart showing an illustrative method for measuring the instantaneous bit rate of a network connection. Initiating agent 400 commences an upstream bit rate measurement by first clearing modem 435's upstream packet transmission buffer 436. A conventional flush packet command may additionally be sent by the initiating agent, in a transmit/echo-receive mode, as a test of buffer clearance. Initiating agent 400 then begins searching for the responding agent by transmitting at least two packets onto the network (operation 501). These network packets are configured such that the first responding agent (typically at the first hop in the network) will immediately return (echo) the network packet back to the initiating agent.

In one embodiment, the initiating agent replaces the destination address of the at least two network packets with its own network address, such as an IP address. Once the responding agent receives the network packet from the upstream channel, it inspects the destination address and, because the destination address is the initiating agent's own network address, the responding agent immediately echoes the packet back to the initiating agent in the downstream channel of the network connection. This is the self-referencing feature of the techniques described herein. Embodiments of the initiating agent are configured to utilize the existing Internet infrastructure to essentially send packets to themselves. These echoed packets can then be used to calculate the instantaneous bit rate of the upstream path in the network connection.

An alternative embodiment accomplishes the same result by setting the lifespan of the at least two network packets to zero so that the responding agent will immediately transmit a packet back to the initiating agent when it is received. This is because, once the responding agent inspects the network packets and realizes their lifespan has already expired, the responding agent will send the packet or error message back to the initiating agent. In one embodiment, the lifespan of the packet can be set to zero using a time-to-live (TTL) field of the packet. In computer networking, TTL was originally designed as a mechanism to limit the lifespan of data in a computer or network by preventing data packets from circulating indefinitely. Once the prescribed count or timespan has elapsed, the packet or error message is sent back to its source. All Internet Protocol (IP) packets include a TTL field that designates the packet's duration before being discarded. It is generally specified in seconds, but in practice the TTL field is used as a hop count. TTL may also be implemented as a counter or timestamp embedded in the data of the packet. The responding agent in the upstream path of the network connection will then return either the received packet or an error message, and as discussed further below, they will be returned back to the initiating agent in the downstream path at the same rate they were received from the initiating agent in the upstream path.

Process 500 continues where the network packets are received back at the initiating agent (operation 503). Then, at operation 505, the inter-packet arrival time of the echoed packets is determined. In one embodiment, initiating agent 400 determines the inter-packet arrival time by the difference in time of arrival between a specified bit of a first network packet of the at least two network packets and a specified bit of a second network packet of the at least two packets. Specifically, initiating agent starts an internal timer 490 upon receipt of one of the bits of the first network packet of the at least two network packets and stops timer 490 upon receipt of one of the bits of the second network packet of the at least two network packets (operation 505). In the preferred embodiment, the timer can be started upon receipt of the last bit of the first packet and stopped upon receipt of the last bit of the second packet. Other embodiments are possible; for instance, more than two packets can be transmitted and the timer can be started upon receipt of any specified bit of the first packet and stopped upon receipt of any specified bit of the last packet. Indeed, the timing can be determined by measuring the time of arrival between any specified bit of any one network packet against the time of arrival of any specified bit of any other network packet.

The initiating agent can then compute the bit rate of the upstream path in the network connection (operation 507). The instantaneous bit rate of the received network packet can be calculated by dividing the total number of bits received between one bit of the first packet and one bit of the second (or subsequent) packet by the inter-packet time of arrival of the received network packets. That is, the instantaneous bit rate of the upstream path of the network connection can be calculated according to the following formula:

$$\text{Bit rate } R = \frac{N}{(T_t - T_i)}$$

where:
$T_i$=time when the specified bit of the first packet was received
$T_t$=time when the specified bit of the subsequent packet was received
N=number of bits received between $T_i$ and $T_t$ (inclusive).

The instantaneous bit rate of the upstream path of the network connection can be calculated in this way because, as discussed above, the bit rate of the upstream path of the network connection is equal to or less than the bit rate of the downstream path. This feature of network connections is built into the infrastructure of the Internet. As the network packets are received at the responding agent, they are echoed back to the initiating agent as discussed above. Because the responding agent can only receive the packets at the upstream bit rate, it can likewise only transmit the packets back to the initiating agent at that same rate (i.e., only as fast as it receives them). This feature allows the upstream path bit rate to be calculated based on the rate at which packets are received by the initiating agent in the downstream path. In other embodiments, the bit rate of the connection can be calculated at the responding agent according to the same techniques and then sent back to the initiating agent.

In still another embodiment, ICMP-type packets are used to carry out measuring bandwidth. In this method, the initiating agent first constructs and sends an ICMP echo request packet to the responding agent and waits for a reply. Provided the responding agent responds with an ICMP echo reply within a specified period, the bandwidth measurement may continue using ICMP-type packets. Second, the initiating agent can then issue at least two ICMP echo request packets to the responding agent and wait for the responding agent to return a corresponding ICMP echo reply packet for each echo request packet issued by the initiating agent. The initiating agent proceeds to measure the inter-packet timing and calculates the connection's bandwidth according to the formula above. The size of the packets may be varied depending on the particular design or application requirements. This completes process 500.

In this manner, the bit rate of the upstream path of the network connection can be calculated at any given point in time and used by the initiating agent to determine the appropriate rate at which to transmit packets over the network. As discussed above, this leads to optimization of the network bandwidth. The initiating agent can maintain the optimal network connection bit rate by continuously keeping the transmit buffer empty and transmitting at the bit rate of the upstream path in the connection. Using conventional methods, network latency usually builds up in the transmit buffers, but the techniques described herein can essentially guarantee that there will always be zero delay (i.e., zero latency) through these buffers. Typically, this can save anywhere from 50 to 2,000 milliseconds depending on the size of the transmit buffer.

In addition, the techniques herein are not limited to the specific embodiments discussed above, as they will work with any properly configured device connected to the Internet. These techniques allow for determining the instantaneous bit rate of a network connection rather than an average bit rate as determined by conventional methods. This allows for optimizing connection speed, particularly for real-time connections, by reducing packet loss, latency, jitter, and retransmission. These techniques can further be implemented in a stand-alone device or can be built into the modem chip or other integrated circuit.

In addition, the techniques described herein are configured to measure the speed of the relevant network connection or link, which is oftentimes the first or closest link. The speed of closest link could also be effectively used for controlling Quality of Service, regardless of the packets' paths to their respective destinations. Although the present invention has been particularly described with reference to the preferred embodiments thereof, it should be readily apparent to those of ordinary skill in the art that changes and modifications in the form and details may be made without departing from the spirit and scope of the invention. In addition, the techniques described herein are not limited to any specific combination of hardware circuitry or software. It will be apparent to skilled artisans from this description that aspects of the present invention may be embodied in software, hardware, firmware, or a combination of these. For instance, in various embodiments, hardwired circuitry may be used in combination with software instructions. Operations may be embodied in computer-executable instructions which cause a general-purpose or special-purpose processor to perform the disclosed operations. In other embodiments, they can be implemented with custom hardware alone. Operations may be performed by specific hardware components that contain hardwired logic configured to perform those same operations.

In addition, embodiments may include various operations as set forth above, or fewer or more operations; or operations in an order different from the order described. Also an embodiment showing a singular component should not be considered limiting; rather, the invention is intended to encompass other embodiments including a plurality of the components, and vice-versa, unless explicitly stated otherwise.

Accordingly, the scope and spirit of the invention should be judged in terms of the claims which follow as well as the legal equivalents thereof.

What is claimed is:

1. A method for measuring instantaneous bit rate of a network connection in a network comprising:
    an initiating agent constructing at least two network packets based on network protocols before transmitting the at least two network packets onto the network;
    causing the initiating agent to transmit the at least two network packets onto the network, including consecutively transmitting first and second network packets;
    receiving the at least two network packets back from a responding agent at the first hop from the initiating agent on the network, wherein based on the construction of the at least two network packets, the responding agent on the network will immediately send the first and second network packets back to the initiating agent instead of forwarding them further onto the network;
    determining inter-packet time of arrival between the received network packets, including determining a difference between the times of arrival of the consecutive first and second network packets; and
    calculating an instantaneous bit rate of the network connection based on the inter-packet time of arrival of the received network packets,
    wherein an upstream bit rate between the initiating agent and the responding agent is less than or equal to a downstream bit rate between the responding agent and the initiating agent,
    and wherein the responding agent sends the first and second network packets to the initiating at the same bit rate on the downstream as the upstream bit rate.

2. The method of claim 1, wherein a same reference clock is used for both clocking transmission of the network packets onto the network and timing of the inter-packet time of arrival between the received network packets so that clock skew within the network is reduced or eliminated.

3. The method of claim 1, wherein constructing includes causing the initiating agent to insert its own network address into a destination address of the network packets.

4. The method of claim 3, wherein the responding agent returns the network packets to the initiating agent based on the destination address of the network packets which is the initiating agent's own network address.

5. The method of claim 1, wherein constructing includes causing the initiating agent to set a lifespan of the network packets equal to zero or a small number.

6. The method of claim 5, wherein the lifespan of the network packets is set in a time-to-live (TTL) field of the packets.

7. The method of claim 5, wherein the responding agent sends the network packets back to the initiating agent because the lifespan of the packets expired when they were received by the responding agent.

8. The method of claim 1, wherein the inter-packet time of arrival between the received network packets is determined by a difference in time of arrival between a specified bit of the first network packet and a specified bit of the second network packet.

9. The method of claim 8, wherein calculating the instantaneous bit rate of the network connection comprises dividing a total number of bits received between the specified bit of the first packet and the specified bit of the second packet by the inter-packet time of arrival of the received network packets.

10. The method of claim 1, further comprising causing a transmission buffer of the initiating agent to be emptied prior to transmission of the network packets.

11. The method of claim 1, wherein bandwidth of the network connection is optimized by matching transmission bit rate of the network packets with the calculated instantaneous bit rate of the network connection.

12. The method of claim 1, wherein the instantaneous bit rate of the network connection is calculated at the responding agent and transmitted back to the initiating agent.

13. An apparatus for measuring instantaneous bit rate of a network connection comprising:
    a system clock;
    a timer coupled with the system clock, wherein the timer is configured to determine inter-packet time of arrival between at least two network packets received over the network connection, including determining a difference between the times of arrival of consecutively transmitted first and second network packets; and
    a controller coupled with the timer, wherein the controller is configured to:
        construct the at least two network packets based on network protocols before transmitting the at least two network packets onto the network;
        cause an initiating agent to transmit the at least two network packets onto the network connection, including consecutively transmitting the first and second network packets;
        receive the at least two network packets back from a responding agent at the first hop from the initiating agent on the network, wherein based on the construction of the at least two network packets, the responding agent on the network will immediately send the first and second network packets back to the initiating agent instead of forwarding them further onto the network; and
        calculate an instantaneous bit rate of the network connection based on the inter-packet time of arrival of the received network packets,
        wherein an upstream bit rate between the initiating agent and the responding agent is less than or equal to a downstream bit rate between the responding agent and the initiating agent,
        and wherein the responding agent sends the first and second network packets to the initiating at the same bit rate on the downstream as the upstream bit rate.

14. The apparatus of claim 13, wherein the system clock is used for both clocking transmission of the network packets onto the network and timing of the inter-packet time of arrival between the received network packets so that clock skew within the network is reduced or eliminated.

15. The apparatus of claim 13, wherein the controller and the initiating agent are incorporated into the same device.

16. The apparatus of claim 13, wherein the controller constructs the at least two network packets by causing the initiating agent to insert its own network address into a destination address of the network packets.

17. The apparatus of claim 16, wherein the responding agent returns the network packets to the initiating agent based on the destination address of the network packets which is the initiating agent's own network address.

18. The apparatus of claim 13, wherein the controller constructs the at least two network packets by causing the initiating agent to set a lifespan of the network packets equal to zero or a small number.

19. The apparatus of claim 18, wherein the lifespan of the network packets is set using a time-to-live (TTL) field of the packets.

20. The apparatus of claim 18, wherein the responding agent sends the network packets back to the initiating agent because the lifespan of the packets expired when they were received by the responding agent.

21. The apparatus of claim 13, wherein the inter-packet time of arrival between the received network packets is determined by a difference in time of arrival between one of the bits of the first network packet and one of the bits of the second network packet.

22. The apparatus of claim 21, wherein calculating the instantaneous bit rate of the network connection comprises dividing a total number of bits received between the bit of the first packet and the bit of the second packet by the inter-packet time of arrival of the received network packets.

23. The apparatus of claim 13, wherein the initiating agent includes a transmit buffer configured to stage the network packets to be transmitted onto the network connection.

24. The apparatus of claim 23, wherein the controller causes the transmit buffer of the initiating agent to be emptied prior to transmission of the network packets.

25. The apparatus of claim 13, wherein bandwidth of the network connection is optimized by matching transmission bit rate of the network packets with the calculated instantaneous bit rate of the network connection.

26. The apparatus of claim 13, wherein the instantaneous bit rate of the network connection is measured at the responding agent and transmitted back to the controller.

* * * * *